Patented Nov. 4, 1952

2,616,893

UNITED STATES PATENT OFFICE 2,616,893

2-(2-THIAZYLTHIO)-1,4 DIHYDROXYBENZENES AND PROCESS FOR THE PREPARATION OF SAME

Thomas H. Newby, Waterbury, Conn., assignor to United States Rubber Company, New York, N. Y., a corporation of New Jersey No Drawing. Original application April 7, 1949, Serial No. 86,108. Divided and this application March 15, 1951, Serial No. 215,860

9 Claims. (Cl. 260—302)

This invention relates to a new class of chemicals and to use thereof as antioxidants for organic substances such as natural rubber and synthetic rubber, particularly rubbery copolymers of butadiene and styrene and rubbery copolymers of butadiene and acrylonitrile, which are susceptible to deterioration by atmospheric oxygen.

The principal object of the present invention is to make available a new class of chemical compounds which are particularly valuable as antioxidants. Another object is to protect organic materials, particularly natural and synthetic rubber, against the deterioration which normally occurs when these materials are exposed to the action of atmospheric oxygen. Another object is to provide a non-staining and non-discoloring antioxidant. Numerous other objects will more fully hereinafter appear.

The chemical compounds of the present invention are the 2-(2thiazylthio)-1,4-dihydroxybenzenes having the general formula

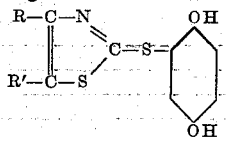

where R and R' may be hydrogen, alkyl, aryl, or part of a ring system. The groups R and R' or the ring of which they are a part may be substituted with groups which do not interfere with the antioxidant action of the compound and which do not interfere with the formation of the compound in accordance with Equations 1 and 2 below, examples of such substituent groups being nitro and hydroxy as well as alkyl such as methyl and ethyl.

The compounds of my invention conveniently may be designated as 2-(2-thiazylthio)-hydroquinones of the benzene series.

The chemical compounds of my invention may be readily prepared by reacting a 2-mercaptothiazole with p-benzoquinone as shown by the following equation:

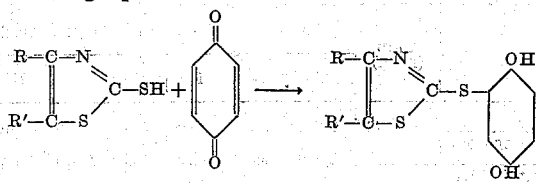

The reaction is typically carried out by reacting equal molar quantities of p-benzoquinone and the 2-mercaptothiazole in an inert solvent at temperatures varying from —10° C. to the boiling point of the solvent. After the reaction has attained the desired degree of completion, the product is recovered in any suitable manner. Typically, the reaction mixture contains a small amount of insoluble material which comprises a mixture of the desired product along with some of the disubstituted material formed as a by-product by oxidation of some of the desired product to a quinone, part of which then combines with an additional molecule of the 2-mercaptothiazole to form a disubstituted hydroquinone.

Examples of 2-mercaptothiazoles which may be reacted with p-benzoquinone to yield compounds of the present invention include:

2-mercaptobenzothiazole
6-nitro-2-mercaptobenzothiazole
6-hydroxy-2-mercaptobenzothiazole
4,5-dimethyl-2-mercaptothiazole
4,5-diethyl-2-mercaptothiazole
4-methyl-2-mercaptothiazole
4-ethyl-2-mercaptothiazole
5-methyl-2-mercaptothiazole
4-phenyl-2-mercaptothiazole
4,5-diphenyl-2-mercaptothiazole
2-mercaptothiazole While p-benzoquinone is preferably used in making the compounds of my invention, I may use 1,4-benzoquinones substituted in suitable positions with suitable groups which do not interfere with the antioxidant action of the compound and which do not interfere with the formation of the compound in the manner described above, for example with alkyl, alkoxy, nitro, and hydroxy groups. At least one position ortho to one of the carbonyl groups should be unsubstituted and any substitution in other positions should be such as to allow the reaction outlined above to take place and not to interfere with the antioxidant action. Possible substituted quinones for use in this reaction will be apparent to those skilled in the art. The most preferred compounds of my invention are those made from p-benzoquinone.

Examples of quinones other than p-benzoquinone which can be used include:

2,5-ditertiarybutyl-p-benzoquinone methoxy-p-benzoquinone
2,5-dimethyl-p-benzoquinone
3,5-dimethyl-p-benzoquinone
nitro-p-benzoquinone
hydroxy-p-benzoquinone The following examples illustrate the preparative method more fully.

Example I.—2-(2-benzothiazylthio)-1,4-dihydroxybenzene.—Quinone (22 g.) was dissolved in 150 cc. of boiling methanol and the solution cooled rapidly to 0–5° C. in an ice bath whereupon the quinone crystallized in fine needles. To this mixture a slurry of 33 g. of 2-mercaptobenzothiazole in 100 cc. of ice-cold methanol was added. The reaction mixture was then stirred for two hours at 0–5° C.

The product was isolated by filtering off the small amount of methanol-insoluble material and then quenching the methanol solution in 500 cc. of hot water. The mixture was boiled and the lumps broken up until no longer sticky. After filtration and drying 42 g. (76% yield) of crude 2-(2-benzothiazylthio)-1,4-dihydroxybenzene melting 204.5–208° C. was obtained. After recrystallization from ethyl acetoacetate it melted 218–219° C.

| Analysis | Carbon | Hydrogen | Sulfur | Notrogen |
|---|---|---|---|---|
| Found | 56.01 | 3.29 | 23.42 | 5.05 |
| Theory four $C_{13}H_9O_2NS_2$ | 56.73 | 3.27 | 23.27 | 5.09 |

*Example II.—2-[2-(4,5-dimethyl thiazylthio)]-1,4-dihydroxybenzene.*—Quinone (11 g.) was precipitated in methanol as in Example I, and 15 g. of 4,5-dimethyl-2-mercaptothiazole in 100 cc. of ice-cold methanol were added to the slurry. The reaction mixture was stirred for two hours at 0–5° C.

The product was worked up by removing most of the methanol under vacuum, and then pouring the residue into 300 cc. of hot water. After boiling the water solution, filtering, and drying the precipitate, 23 g. of 2-[2-(4,5-dimethyl thiazylthio)]-1,4-dihydroxybenzene were obtained. Treatment of this material with hot methanol gave 20 g. of a methanol-soluble solid melting 148–152° C. and a small amount of methanol-insoluble material. The yield of the methanol-soluble product was 79%.

| Analysis | Nitrogen | Sulfur |
|---|---|---|
| Found | 5.37 | 25.59 |
| Theory for $C_{11}H_{11}O_2NS_2$ | 5.54 | 25.30 |

*Example III.—2-[2-(4-methyl thiazylthio)]-1,4-dihydroxybenzene.*—Quinone (21 g.) and 4-methyl-2-mercaptothiazole (26 g.) were reacted as described in Example II for the dimethyl body.

The product was worked up by filtering off the methanol-insoluble material (11 g. melting 239–247° C.) and then quenching the methanol filtrate with hot water. After boiling the water solution for a short time the solids were filtered off. The product when dry weighed 32 g. (67% yield) and melted 158–161° C. after two washings with hot benzene.

| Analysis | Nitrogen | Sulfur |
|---|---|---|
| Found | 5.89 | 27.04 |
| Theory for $C_{10}H_9O_2NS_2$ | 5.88 | 26.89 |

The material melting 239–247° C. was shown by analysis to be a mixture of mono- and di-substituted 1,4-dihydroxybenzene.

Any of the compounds of my invention may be employed as antioxidants for the organic substance to be protected against oxidative deterioration. In practice, a suitable amount of the chemical is incorporated uniformly into the material to be protected, usually by simple physical admixture in any suitable equipment. The amount used should be such as to give the desired degree of protection. Usually an amount ranging from 0.05 to 5.0 parts per 100 parts of organic substance will be used. In the case of rubber, an amount of the order of 0.05 to 5.0 parts per 100 parts of rubber will be sufficient to give excellent resistance to oxidation.

The compounds of the present invention are effective antioxidants for natural rubber or any synthetic rubber which is normally subject to deterioration upon contact with oxygen. Examples of such synthetic rubbers include the rubbery copolymers of butadiene and styrene and the rubbery copolymers of butadiene and acrylonitrile.

Rubber antioxidant tests

The following tests illustrate the use of compounds of the present invention as rubber antioxidants:

The chemicals from Examples I, II and III, 2-(2-benzothiazylthio)-1,4-dihydroxybenzene, 2-[2-(4,5-dimethyl thiazylthio)]-1,4-dihydroxybenzene, and 2-[2-(4-methyl thiazylthio)]-1,4-dihydroxybenzene were tested in a white natural rubber stock of the following composition:

| | Parts by weight |
|---|---|
| Pale crepe | 100 |
| Zinc oxide | 10 |
| Lithopone | 60 |
| Whiting | 60 |
| Zinc laurate | 0.5 |
| Sulphur | 3.0 |
| Tetramethyl thiuram monosulfide | 0.15 |

The use of the herein-disclosed chemicals for the protection of rubber against deterioration upon contact with oxygen is the subject matter of copending application Serial No. 86,108, filed April 7, 1949, of which the instant application is a division.

The antioxidant was incorporated in the ratio of 1.0 part per 100 parts of rubber. Cures were made for 10, 20 and 30 minutes at 30 pounds steam pressure. Table I shows the tensiles and elongations of these stocks unaged, after aging for ninety-six hours under 300 pounds of oxygen pressure at 70° C. and after aging for forty-eight hours at 100° C. in an air oven.

| Antioxidant | Cure (Min.) | Unaged T | Unaged E | Heat Aged T | Heat Aged E | Oxygen Aged T | Oxygen Aged E |
|---|---|---|---|---|---|---|---|
| None | 10 | 2,340 | 663 | 660 | 560 | 990 | 510 |
| A. (2-(2-benzothiazylthio)-1,4-dihydroxybenzene) | | 2,330 | 650 | 890 | 503 | 1,870 | 505 |
| B. (2-[2-(4,5-dimethyl thiazylthio)]-1,4-dihydroxybenzene) | | 2,415 | 660 | 1,036 | 540 | 2,040 | 610 |
| C. (2-[2-(4-methyl thiazylthio)]-1,4-dihydroxybenzene) | | 2,350 | 655 | 930 | 476 | 1,950 | 620 |
| None | 20 | 2,080 | 645 | 700 | 496 | failed | |
| A | | 2,020 | 605 | 840 | 460 | 1,660 | 546 |
| B | | 2,064 | 645 | 750 | 465 | 1,720 | 576 |
| C | | 2,030 | 636 | 880 | 455 | 1,810 | 600 |
| None | 30 | 2,080 | 650 | 690 | 500 | failed | |
| A | | 2,130 | 645 | 680 | 426 | 1,480 | 545 |
| B | | 2,075 | 655 | 870 | 470 | 1,660 | 575 |
| C | | 2,010 | 640 | 940 | 466 | 1,760 | 610 |

T—tensile.
E—elongation.

The crude methanol-insoluble materials obtained in the three examples cited (mixtures of the mono- and di-substituted 1,4-dihydroxybenzenes) and the quinones obtained by oxidation of the primary products are also excellent antioxidants for rubber.

The chemicals of this invention are of value as antioxidants for synthetic rubber. For example, 2 - (2 - benzothiazylthio) - 1,4 - dihydroxybenzene, when incorporated into butadiene-styrene copolymer (GR–S) in the ratio of 1.5 parts per 100 parts of polymer, protected the polymer against resinification for eleven hours at 130° C. The control resinified in one and one-half hours.

While the invention has been particularly described for 2-(2-thiazylthio)-1,4-dihydroxybenzenes, it is equally applicable to other quinone-mercaptothiazole compounds such as:

2 - (2 - benzothiazylthio) - 1,4 - dihydroxy - 5-methylbenzene
3 - (2 - benzothiazylthio) - 1,4 - dihydroxy - 2,5-ditertiary-butylbenzene
2 - [2 - (4 - methyl thiazylthio)] - 1,4 - dihydroxy-5-methoxybenzene
2 - (6 - nitrobenzothiazyl - 2 - thio) - 1,4-dihydroxybenzene
2 - (6 - aminobenzothiazyl - 2 - thio) - 1,4-dihydroxybenzene
2 - (6 - hydroxybenzothiazyl - 2 - thio) - 1,4-dihydroxybenzene
2 - [2 - (4 - phenylthiazylthio)] - 1,4 - dihydroxybenzene
2 - [2 - (4,5 - diethyl thiazylthio)] - 1,4-dihydroxybenzene The antioxidants of my invention have the great advantage that in addition to their excellent antioxidant properties they do not discolor organic materials upon exposure to light nor do they stain lacquers or cloth with which they come in contact. This is particularly important in the case of use with rubber to make light-colored or white stocks or articles.

Having thus described my invention what I claim and desire to protect by Letters Patent is:

1. As a new chemical compound, a 2-(2-thiazylthio)-1,4-dihydroxybenzene.
2. As a new chemical compound, 2-(2-benzothiazylthio)-1,4-dihydroxybenzene.
3. As a new chemical compound, 2-[2-(4,5-dimethyl thiazylthio)]-1,4-dihydroxybenzene.
4. As a new chemical compound, 2-[2-(4-methyl thiazylthio)]-1,4-dihydroxybenzene.
5. The method which comprises bringing together a 1,4-dihydroxybenzene and a 2-mercaptothiazole in approximately equimolar proportions in an inert solvent for the reactants at a temperature ranging from —10° C. to the boiling point of said solvent, and after the reaction has attained the desired degree of completion recovering from the reaction mixture a 2-(2-thiazylthio)-1,4-dihydroxybenzene.
6. The method of claim 5 wherein said 1,4-dihydroxybenzene is p-benzoquinone and wherein said 2-mercaptothiazole is 2-mercaptobenzothiazole.
7. The method of claim 5 wherein said 1,4-dihydroxybenzene is p-benzoquinone and wherein said 2-mercaptothiazole is 4,5-dimethyl-2-mercaptothiazole.
8. The method of claim 5 wherein said 1,4-dihydroxybenzene is p-benzoquinone and wherein said 2-mercaptothiazole is 4-methyl-2-mercaptothiazole.
9. The method of claim 5 wherein said inert solvent is methanol and wherein the reaction is carried out at a temperature of from 0° to 5° C.

THOMAS H. NEWBY.

No references cited.